Figure 1:
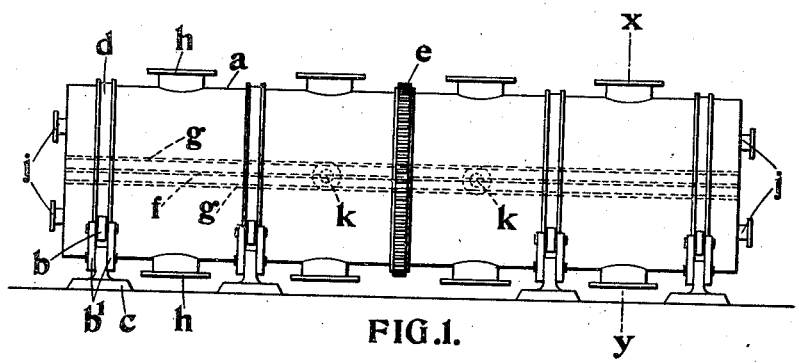

P. C. C. ISHERWOOD.
APPARATUS FOR MAKING AND FILTERING SOLUTIONS APPLICABLE IN THE EXTRACTION
OF METALS FROM ORES AND FOR LIKE PURPOSES.
APPLICATION FILED JUNE 26, 1914.

1,110,790.

Patented Sept. 15, 1914.

Witnesses—

Inventor
Percy Claude Cameron Isherwood
by
Attorney.

UNITED STATES PATENT OFFICE.

PERCY CLAUDE CAMERON ISHERWOOD, OF BUSHEY HEATH, ENGLAND.

APPARATUS FOR MAKING AND FILTERING SOLUTIONS, APPLICABLE IN THE EXTRACTION OF METALS FROM ORES AND FOR LIKE PURPOSES.

1,110,790.

Specification of Letters Patent. Patented Sept. 15, 1914.

Application filed June 26, 1914. Serial No. 847,501.

*To all whom it may concern:*

Be it known that I, PERCY CLAUDE CAMERON ISHERWOOD, Ph. D., a subject of the King of Great Britain and Ireland, residing at Moss Cottage, Bushey Heath, Herts, England, have invented certain new and useful Improvements in and Relating to Apparatus for Making and Filtering Solutions, Applicable in the Extraction of Metals from Ores and for like Purposes, of which the following is a specification.

This invention relates to a filtering apparatus adapted for the extraction of ores and similar substances under high temperature and pressure and the filtration of solutions which by containing slimy substances, such as gelatinous silica or extremely fine ore particles, makes filtration by ordinary means a difficult operation.

The invention is of special application for the extraction of substances such as refractory zinc lead ores and for the filtration of the solution of the dissolved compounds from their slimy or finely divided residues.

According to the invention I provide a circular cylindrical casing adapted to rotate, and provided centrally with a partition, by which two compartments or two sets of compartments are formed, within which separate charges of the ores or other substances to be extracted are treated. Within each of the compartments thus formed a filter plate is mounted, so that thus a space is formed at each side of the central partition and beneath each filter plate. The charge of ore or other substance to be treated is introduced into one of the compartments of the casing, and for the purpose the casing is rotated so that this compartment is disposed lowermost. On the charging of this compartment with the ore or the substance to be treated and with the solution necessary for the extraction of the soluble compounds steam under pressure is admitted by which the solution is heated to a high temperature and during this operation the casing may be rotated or rotary reciprocation may be imparted to it. On the completion of the extraction that compartment from which the solution is to be withdrawn is brought into the uppermost position by the rotation of the casing. By this means the coarse particles of the charge in the uppermost compartment come to lie upon the filter plate and the finer particles lie over the coarser particles. The internal pressure still maintained within the compartment aids in the filtration of the solution through the charge and through the filter plate. It will be understood that the solution accumulates in the space beneath the filter plate and discharges through a suitable outlet, which is under the control of a valve. On the solution being discharged the casing is rotated, so that the compartment lies in the lowermost position. The discharge manholes are then opened and the treated substance or ore is then discharged. The casing is then in the position in which the empty compartment lies lowermost and a further quantity of ore or the substance to be treated is then charged therein together with the solution necessary for the purpose of extraction. The solution produced in the next compartment is then withdrawn and the charge expelled, and so the operations continue.

It will be understood that when the vessel is rotated so as to bring it in a position for the charge to be filtered the other compartment which at first was in the uppermost position is now in the lowermost position and therefore the time of this filtration is utilizable for emptying the residue, recharging with fresh ore and solution and extracting the said ore with the said solution under conditions of high temperature and pressure. Thus both compartments are simultaneously utilized effecting economy in time and space.

The invention comprises the construction which is hereinafter described.

I may provide for the admission of steam to be effected into each compartment, while the casing is rotated or rotary reciprocation imparted to it, or I may provide that the steam may be admitted into each compartment while the casing is held stationary and movement imparted to it only after the steam pipes have been disconnected. I may provide the respective compartments divided by diametrical partitions, whereby a number of sets of compartments are formed with corresponding discharge manholes and discharge outlets for the solutions produced.

The invention is illustrated in the accompanying diagrammatic drawings which show a filter of circular section.

Figure 2:
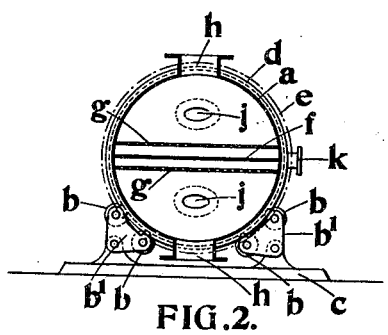

Figure 1 is a side view of the filter, Fig. 2 is a section on the line *x*, *y* of Fig. 1.

In carrying the invention into effect according to the construction illustrated, in which the filter is of circular cross section, I provide a longitudinal casing *a* mounted upon a number of sets of rollers *b*, so that the weight of the casing and the charges contained therein may be uniformly distributed and carried upon the sets of rollers referred to. It is preferred to provide two rollers *b b* mounted between two plates *b¹ b¹* pivotally carried upon a foundation plate *c* so that thus the weight of the casing is borne by two sets of rollers disposed in the respective sides of the casing in the same line, and advantageously the whole casing may be carried by four of such sets of rollers; and annular channels *d* may be formed on the periphery of the casing *a* within which the said rollers may work, so that thus fixity of position of the casing is secured without the provision of any other means for the purpose, while at the same time the casing can be easily rotated. For this latter purpose a gear wheel *e* is mounted centrally on the casing, and motion is imparted thereto from any suitable source of motive power, so that the casing may be rotated when required. Means may be provided for the rotary reciprocation of the apparatus to any extent that may be desired either by gear deriving movement from a source of motive power or by means of hand-operated gear. Similarly, hand-operated gear may be provided to rotate the casing continuously in the same direction. A central partition *f* is provided to extend the whole length of the casing, and this is suitably supported at a number of points. A filter plate *g* extends the whole length of the casing on each side of the central partition and each of the filter plates provided is suitably supported. The filter plate may be provided as a perforated metal plate serving to support the filtering material, which may consist of a layer of gauze and fabric or felt. It will, however, be understood that the filter plate may be otherwise provided. In a position immediately opposite the filter plate a number of discharge manholes *h* are mounted in line, the respective sets of manholes for the two compartments being disposed in diametrically opposite positions. Elliptical charging manholes *j* may be provided in the end plates at each end of the casing. An outlet connection *k* may be provided in the length of the casing for withdrawing the solution from the spaces respectively formed between the partition and the filter plates. A steam pipe may, however, be provided to receive the supply at each end of the casing for each compartment, and a central connection may be mounted on the end plate at either or each end, whereby the admission of steam may be maintained while the casing is rotated. It will, however, be understood that means may be provided for the ready disconnection of the steam supply pipes.

What I claim as my invention and desire to secure by Letters Patent is:—

1. Apparatus for making and filtering solutions applicable in the extraction of metals from ores and for like purposes comprising a rotatable casing divided longitudinally by a partition into compartments, a filter plate for each of said compartments, a solution discharge outlet on the inner side of each of such plates, and manholes to each compartment on the outer side of such plate for charging and discharging the compartments, substantially as described.

2. Apparatus for making and filtering solutions applicable in the extraction of metals from ores and the like purposes, comprising a rotatable casing divided longitudinally by a partition into compartments, a filter plate within said compartments, and a solution discharge outlet on the inner side of said filter plates respectively, substantially as described.

In testimony whereof I have hereunto signed my name to this specification in the presence of two subscribing witnesses.

PERCY CLAUDE CAMERON ISHERWOOD.

Witnesses:
W. E. ROGERS,
E. J. WORTH.